Patented May 19, 1953

2,639,280

UNITED STATES PATENT OFFICE 2,639,280

PROCESS FOR PREPARING CELLULOSE ACETAL DERIVATIVES

John W. Mench and Marian S. Lounsbery, Rochester, N. Y., assignors to Eastman Kodak Company, Rochester, N. Y., a corporation of New Jersey No Drawing. Application September 30, 1950, Serial No. 187,823

7 Claims. (Cl. 260—226)

This invention relates to the preparation of oxy derivatives of cellulose by the reaction of lower fatty acid esters of cellulose with vinyl ethers to give cellulose mixed acetal derivatives.

Heretofore, cellulose compounds of the oxy type have been prepared only by the use of strong bases to promote the reaction thereof. As vinyl ethers do not react with cellulose compounds under basic conditions, cellulose derivatives have never previously been prepared by reacting vinyl ethers thereon.

One object of our invention is to provide a method of preparing cellulose derivatives by reacting cellulose esters and vinyl ethers. Another object of our invention is to provide a method of preparing cellulose derivatives soluble in a wide variety of organic solvents, which derivatives are readily converted to water-soluble compounds. Other objects of our invention will appear herein.

We have found that partially substituted cellulose esters are readily reacted with vinyl ethers in the presence of acidic catalyst without any danger of removing acyl groups from the cellulose ester or modifying the reagent employed. By thus reacting cellulose esters and vinyl ethers, cellulose derivative products are obtained having good solubility in organic solvents and better moisture resistance than the starting ester.

The esters which we have found to be particularly suitable for use as the starting material in processes in accordance with our invention are the lower fatty acid esters of cellulose having .4 to 2.6 hydroxyls per $C_6$ unit of cellulose. Some of the esters which may be used are cellulose acetate, cellulose acetate propionate, cellulose acetate butyrate, or esters in which the predominant acyl is acetyl, propionyl and/or butyryl. Cellulose acetates having an acetyl content of 16–40 percent are especially useful for this purpose.

The reagents which may be reacted with cellulose esters in accordance with our invention are either the aliphatic or cyclic vinyl ethers such as:

Dihydropyran, both substituted and unsubstituted
Vinyl ethyl ether
Vinyl isobutyl ether
Vinyl n-butyl ether
Vinyl 2-chloro ethyl ether
Vinyl 2-methoxyethyl ether
Vinyl 2-ethyl hexyl ether or in fact any ether of vinyl alcohol and a saturated aliphatic alcohol.

The reaction is carried out in the presence of an acid catalyst using an inert organic solvent so that the proportion of liquid to cellulose ester is at least four to one. The solvent should either be a solvent for the cellulose ester and the reagent employed, or should be a solvent for the reagent and at least a good swelling agent for the cellulose ester which is employed. Some of the solvents which have been found to be particularly effective are acetone, acetic acid, dioxane, ethylene formal, methyl acetate, ethylene chloride, methylene chloride, chloroform, formamide and dimethyl formamide. In the case, for instance of cellulose acetate, solvents such as acetone or methyl acetate are particularly effective when such esters have an acetyl content above 30 percent. Even in those cases where the organic liquid is not a solvent for the cellulose acetate, by strongly swelling the cellulose ester the reaction will readily occur. For cellulose acetates having an acetyl content of less than 30 percent, formamide has been found to be particularly useful as the solvent in the reaction mass.

As catalyst for promoting the reaction described, any of the stronger acids may be employed. Acids which have been found to be particularly suitable in this connection are hydrochloric, sulfuric or paratoluene sulfonic acid. Other strongly acidic catalysts such as boron trifluoride are useful for promoting this reaction. The catalyst need only be 0.1–1 percent of the total mass. The reaction described will occur at any moderate temperature such as 0°–150° C., and usually temperatures within the 40–60° range are preferred. If it is desired to speed up the reaction time, the temperature may be increased although in that case it may be desirable to employ one of the higher boiling solvents in the list given, whereas if reaction time is not of importance or if a long time of reaction is desired, lower temperatures may be employed.

The products prepared by the process in accordance with our invention can be subjected to a hydrolysis in aqueous or alcoholic alkali, whereby the lower fatty acid groups are removed therefrom and products soluble in water may be obtained. This hydrolysis may be carried out merely by suspending the product in the alkaline liquid for the time necessary to remove all of the fatty acid groups from the product. Ordinarily, ample time is allowed for this removal to occur with the strength of alkali which is employed.

The following examples illustrate our invention:

*Example 1.*—131 parts of cellulose acetate containing 31.1 per cent of acetyl (1.68 groups per glucose unit) was suspended in a mixture of 850 parts of acetone and 175 parts of dihydropyran (cyclic vinyl ether) to which has been added 0.75 part of concentrated hydrochloric acid, the latter being the catalyst. The mixture was placed in an agitated vessel and was held at 50–55° C. for 6 hours with constant agitation. The mass was then diluted with acetone and the product obtained was precipitated by pouring into water. Analysis showed an acetyl content of 23.8 percent which is equivalent to the introduction of 0.84 tetrahydropyroxy group per glucose unit. In addition to solubility of the product in various cellulose acetate solvents, the product obtained was also soluble in the following: Cellosolve, β,β'-dichloroethyl ether, acetone, methyl ethyl ketone, cyclohexanone, methyl formate, methyl-, ethyl-, i-propyl-, n-butyl-, and amyl acetates, methyl Cellosolve-, and Cellosolve acetates, methylene-, ethylene-, and propylene chlorides, chloroform, trichloroethylene, tetrachloroethane, chlorobenzene, acrylonitrile, nitromethane, nitroethane, and 2-nitropropane, nitrobenzene, acetone-methanol 4:1 and 1:1, ethyl acetate-ethanol 4:1 and 1:1, propylene chloride-methanol 4:1 and 1:1, benzene-methanol 4:1 and 1:1, and toluene-methanol 4:1 and 1:1.

*Example 2.*—100 parts of cellulose acetate containing 39 percent of acetyl (2.37 groups per glucose unit) was dissolved in a mixture of 70 parts of vinyl ethyl ether, 450 parts acetone and 1.5 parts of concentrated hydrochloric acid as the catalyst. The mass was reacted in an agitated vessel for one-half hour at 55° C. It was then isolated by precipitating into water. The product, in addition to being soluble in cellulose ester solvents, was soluble in the following: methyl i-butyl ketone, i-propyl-, n-butyl-, and amyl acetates, ethylene chloride, propylene chloride, chloroform, 2-nitropropane, nitrobenzene, ethyl acetate-ethanol 1:1, ethylene chloride-methanol 1:4, benzene-methanol 4:1 and 1:1, and toluene methanol 4:1 and 1:1.

*Example 3.*—Ten parts of the product obtained from Example 1 were suspended in 300 parts of normal potassium hydroxide in 95 percent ethanol for 20 hours. At the end of this time, the material was washed with methanol until free of alkali and potassium acetate and was then dried. The product obtained was completely soluble in cold distilled water and precipitated from the solution upon warming.

*Example 4.*—Ten parts of the product from Example 1 were dissolved in 15 percent aqueous ammonia and allowed to stand for 20 hours. The resulting product was separated from the mass by precipitating in acetone, obtaining a product which was completely soluble in cold distilled water.

*Example 5.*—Two ten-part portions of the product obtained in Example 2 were treated with alkali in the same manner described in Examples 3 and 4. In each case products were obtained which were readily soluble in cold distilled water.

Example 2 was duplicated using instead of vinyl ethyl the following ethers respectively: vinyl-n-butyl ether, vinyl isobutyl ether, vinyl-2-chloroethyl ether, vinyl 2-methoxyethyl ether and vinyl 2-ethyl hexyl ether, and in each case similar results were obtained.

The cellulose derivatives obtained in accordance with our invention are useful for coating purposes or in any connection in which cellulose esters having a wide range of solubility are useful.

We claim:

1. A process for preparing oxy derivatives of cellulose which comprises mixing a lower fatty acid ester of cellulose having 0.4–2.6 hydroxyls per $C_6$ unit of cellulose with a vinyl ether selected from the group consisting of the cyclic vinyl oxygen ethers and the aliphatic monovinyl oxygen ethers and a strongly acidic catalyst until a cellulose acetal derivative is obtained.

2. A process for preparing oxy derivatives of cellulose which comprises mixing cellulose acetate having 0.4–2.6 hydroxyls per $C_6$ unit of cellulose with a vinyl ether selected from the group consisting of the cyclic vinyl oxygen ethers and the aliphatic monovinyl oxygen ethers and a strongly acidic catalyst until a cellulose acetal derivative is obtained.

3. A process for preparing oxy derivatives of cellulose which comprises mixing cellulose acetate having 0.4–2.6 hydroxyls per $C_6$ unit of cellulose with dihydropyran and a strongly acidic catalyst until a cellulose acetal derivative is obtained.

4. A process for preparing oxy derivatives of cellulose which comprises mixing cellulose acetate having 0.4–2.6 hydroxyls per $C_6$ unit of cellulose with vinyl ethyl ether and a strongly acidic catalyst until a cellulose acetal derivative is obtained.

5. A process for preparing oxy derivatives of cellulose which comprises mixing cellulose acetate having 0.4–2.6 hydroxyls per $C_6$ unit of cellulose with vinyl iso-butyl ether and a strongly acidic catalyst until a cellulose acetal derivative is obtained.

6. A process for preparing oxy derivatives of cellulose which comprises mixing a lower fatty acid ester of cellulose having 0.4–2.6 hydroxyls per $C_6$ unit of cellulose with a vinyl ether selected from the group consisting of the cyclic vinyl oxygen ethers and the aliphatic monovinyl oxygen ethers and hydrochloric acid until a cellulose acetal derivative is obtained.

7. A process for preparing oxy derivatives of cellulose which comprises mixing a lower fatty acid ester of cellulose having 0.4–2.6 hydroxyls per $C_6$ unit of cellulose with a vinyl ether selected from the group consisting of the cyclic vinyl oxygen ethers and the aliphatic monovinyl oxygen ethers and a strongly acidic catalyst until a cellulose acetal derivative is obtained and then treating the product obtained with a dilute solution of alkali to hydrolyze off the lower fatty acid groups.

JOHN W. MENCH.
MARIAN S. LOUNSBERY.

References Cited in the file of this patent

UNITED STATES PATENTS

| Number | Name | Date |
|---|---|---|
| 2,095,524 | Lilienfeld | Oct. 12, 1937 |
| 2,100,369 | Whitehead | Nov. 30, 1937 |
| 2,132,181 | Neugebaure | Oct. 4, 1938 |
| 2,316,129 | Bock et al. | Apr. 6, 1943 |
| 2,539,417 | Grassie | Jan. 30, 1951 |
| 2,580,351 | Grassie | Dec. 25, 1951 |
| 2,580,352 | Grassie | Dec. 25, 1951 |